United States Patent
Dresler

(10) Patent No.: US 6,722,866 B1
(45) Date of Patent: Apr. 20, 2004

(54) PUMP SYSTEM FOR DELIVERING CRYOGENIC LIQUIDS

(75) Inventor: Helmut Dresler, Trostberg (DE)

(73) Assignee: Linde AG, Hollriegelskreuth (DE)

( * ) Notice: Subject to any disclaimer, the term of this patent is extended or adjusted under 35 U.S.C. 154(b) by 0 days.

(21) Appl. No.: 09/958,140

(22) PCT Filed: Apr. 5, 2000

(86) PCT No.: PCT/EP00/03033

§ 371 (c)(1),
(2), (4) Date: Apr. 16, 2002

(87) PCT Pub. No.: WO00/61944

PCT Pub. Date: Oct. 19, 2000

(30) Foreign Application Priority Data

Apr. 8, 1999 (DE) .......................................... 199 15 847

(51) Int. Cl.[7] ............................................... F04B 39/10
(52) U.S. Cl. ..................... 417/534; 417/269; 417/471; 417/555.1; 417/525; 91/422
(58) Field of Search ........................... 62/50.6; 417/269, 417/471, 525, 555.1, 901; 91/534, 422

(56) References Cited

U.S. PATENT DOCUMENTS

| | | | | |
|---|---|---|---|---|
| 3,692,438 A | * | 9/1972 | Schapel ...................... | 417/547 |
| 4,495,855 A | * | 1/1985 | Murakami et al. .............. | 92/71 |
| 4,639,197 A | * | 1/1987 | Tornare et al. .............. | 417/259 |
| 4,813,342 A | * | 3/1989 | Schneider et al. ............. | 92/207 |
| 4,932,214 A | * | 6/1990 | Nieratscher et al. .......... | 62/50.6 |
| 5,511,955 A | * | 4/1996 | Brown et al. ................ | 417/259 |
| 5,575,626 A | * | 11/1996 | Brown et al. ................ | 417/251 |

* cited by examiner

Primary Examiner—Justine R. Yu
Assistant Examiner—Emmanuel Sayoc
(74) Attorney, Agent, or Firm—Millen, White, Zelano & Branigan, P.C.

(57) ABSTRACT

A pump system for delivering cryogenic liquids is proposed that is suitable, for example, for refueling motor vehicles with $H_2$. It consists of a container for receiving the cryogenic liquid, in which at least one pump is arranged that is designed as a reciprocating pump with connecting rod actuation and spring recover. Pump cylinder (10) of the reciprocating pump is divided by means of plunger (24, 37) into two chambers (a and b) that are arranged on the pressure side or the induction side. By exerting tensile forces on connecting rod (29), in the pressure stroke the cryogenic liquid that is located in the container is initially trapped in chamber (b). When connecting rod (29) is returned to its starting position by return spring (23), the liquid that is trapped in chamber (b) is then hurled without pressure into chamber (a). In the subsequent pressure stroke, the liquid is finally released via a gap (d) to a pressure housing and from there to the consumer by exerting tensile forces on connecting rod (29).

8 Claims, 2 Drawing Sheets

PUMP SYSTEM FOR DELIVERING CRYOGENIC LIQUIDS

The invention relates to a pump system for delivering cryogenic liquids with a container for receiving cryogenic liquid and at least one reciprocating pump that is arranged in the container in such a way that it can be immersed in the cryogenic liquid.

To deliver cryogenic liquids at temperatures of below −200° C., to date generally one-cylinder pumps that are inserted from above into an insulating vessel are used. For reasons of installation technology, the discharge of the feeder stream is carried out via this upper pump installation opening in the insulating vessel. Filling the vessels with the media to be delivered is carried out in most cases by a large storage tank, whereby determining the maximum filling height in these vessels is found by expansion pipes (sounding pipes) or content displays. The control of the maximum filling height is carried out in most cases manually or by a contact that is triggered by the liquid, by which a solenoid valve is actuated in the gas feed or exhaust line. Since the pumps cannot be operated without sub-cooling the feeder liquid, these large-volume vessels have a pressure buildup device by which the feeder liquid can be sub-cooled within a short time.

Since especially hydrogen in liquefied form is becoming increasingly more important and motor vehicles are already operated with hydrogen, it is necessary to provide suitable pumps for refueling these motor vehicles.

The known pumps may be suitable for laboratory experiments with small feeder streams and large reliable pressure pulsations; for a quick, pulsation-free liquid refueling of motor vehicles, however, this type of pump is unsuitable. In addition, such "gas station pumps" must always be ready for use (cold-start) so that by the structurally necessary compact type of design in the known pumps, an enormous flow of heat into the liquid to be delivered takes place and the liquid sub-cooling that is necessary for the function is quickly withdrawn.

The object of this invention is to make available a pump system of the above-mentioned type with which larger amounts of cryogenic liquids, especially also liquid hydrogen, can also be delivered economically and reliably.

This object is achieved according to the invention in that the reciprocating pump has a connecting rod that is connected to the plunger, which is brought out from the container so that tensile forces can be applied from outside, and the connecting rod is provided with a return spring in such a way that the plunger can be returned to a starting position opposite the pressure stroke.

Several such pumps that are connected on the pressure side to a common pressure housing are suitably inserted in the container. Because of the possibility of individual installation and the pumps that operate on suction, the cross-sections that are relevant for heat conduction at the pumps and at the container are kept very small, by which only a very small input of heat into the container liquid is carried out. For further reduction of heat input in the container, the connecting rod is preferably brought out from the container via a seal. In the case of the especially practical solution, according to which the pump is used from above in the container, the connecting rod is brought out from the container via a heat-insulated container neck. To further reduce the gas heat conduction, an insulating cartridge can be provided in the neck of the container. In addition, the container is advantageously vacuum-insulated.

According to an especially preferred embodiment of the invention, the pump cylinder of the reciprocating pump is divided by the plunger into a pressure side and an induction side, whereby the plunger has a plunger body as well as a movable plunger ring that is brought to rest on the plunger body when the plunger moves in the direction opposite the pressure stroke in such a way that a gap is formed that produces a connection between the pressure side and the induction side and closes the gap when the plunger moves in the pressure stroke.

On the pressure-side end of the pump cylinder, a spring-loaded exhaust valve is provided. In addition, on the induction-side end of the pump cylinder, a bottom valve is arranged that can be actuated by means of the connecting rod in such a way that it opens on the pressure stroke and is closed when the stroke reverses.

Also, at the pressure-side end of the pump cylinder, a seal is suitably arranged to seal the connecting rod relative to the pump housing, which has a valve that can be actuated by the connecting rod, and said valve is closed when tensile forces are exerted on the connecting rod and is opened when the connecting rod returns under the action of the spring.

The pump system according to the invention can advantageously be used for a whole series of applications. In connection with a corresponding swash plate drive that is arranged outside of the container and that is connected with the connecting rods to the individual reciprocating pumps, the number as well as the diameter of the individual pumps in a common pressure housing vary greatly, so that the pumps according to this design principle can be matched to virtually all required deliveries with minimal pressure pulsation. Because of the merits of this pump design relative to the previous design, the use of such pumps is also conceivable as an aircraft pump in the new generation of hydrogen-driven aircraft. Because of the small masses of the pump system, the cooling losses are very low. By the very simple design structure, a very reasonably priced, reliable and technically high-quality pump is made available.

Below, the invention is to be explained in more detail based on the embodiments that are depicted diagrammatically in the figures.

Here:

Figure 1:
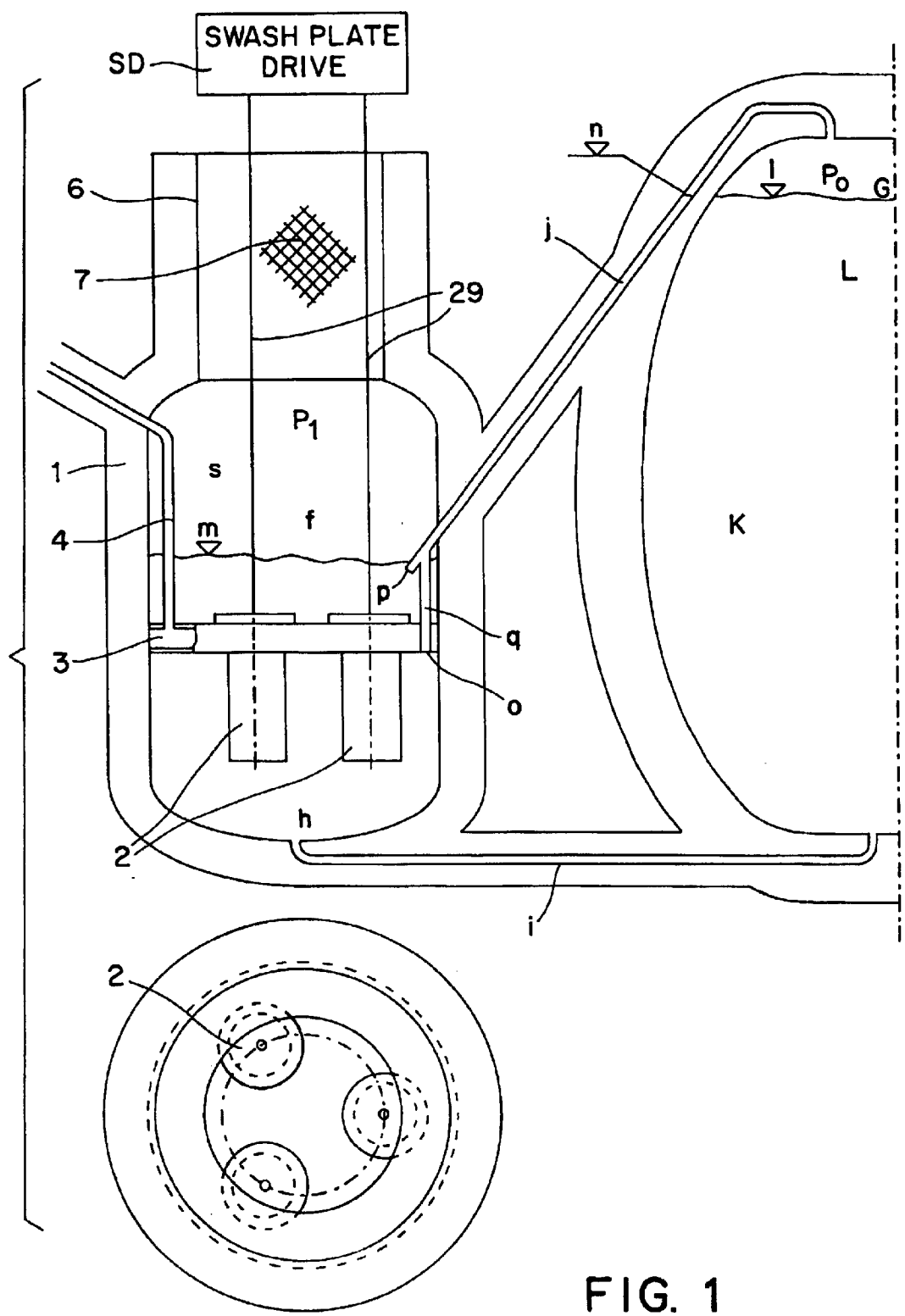
FIG. 1 shows the installation of a three-cylinder hydrogen pump in a container.

FIG. 1 depicts a container 1 that has a completely integrated pressure housing 3 that is immersed in the stored liquid for receiving and for fastening the three pumps 2 that are individually inserted from above. The pressure sides of three pumps 2 are connected to one another via this pressure housing. The conduction of the largely pulsation-free pressure liquid from pressure housing 3 is carried out via pressure line 4 that is also integrated in container 1. By the individual installation of pumps 2 that operate on suction, the cross-sections that are relevant to heat conduction at pumps 2 as well as container 1 can be kept very small. This is achieved in particular by thin connecting rods 29 and thin-walled and small container neck pipe 6. In particular for the operation with liquid hydrogen, the reduced input of heat that is achieved with the invention is of unusual importance, since liquid hydrogen has a very low temperature of about −253° C. and a very low level of evaporation heat. This is aggravated by the fact that as a "gas station pump," the pump must always be operation-ready (cold-start), and the gas accumulation that is produced by the input of heat is considered toxic. Since hydrogen gas has the highest value of gas heat conduction of all technical gases, an insulating cartridge 7 that consists of thin-walled glass fabric-epoxite resin with an insulating bed with the through-holes for connecting rod 29 is used in container neck pipe 6. By this measure, the input of heat into the container is further reduced.

Figure 2:
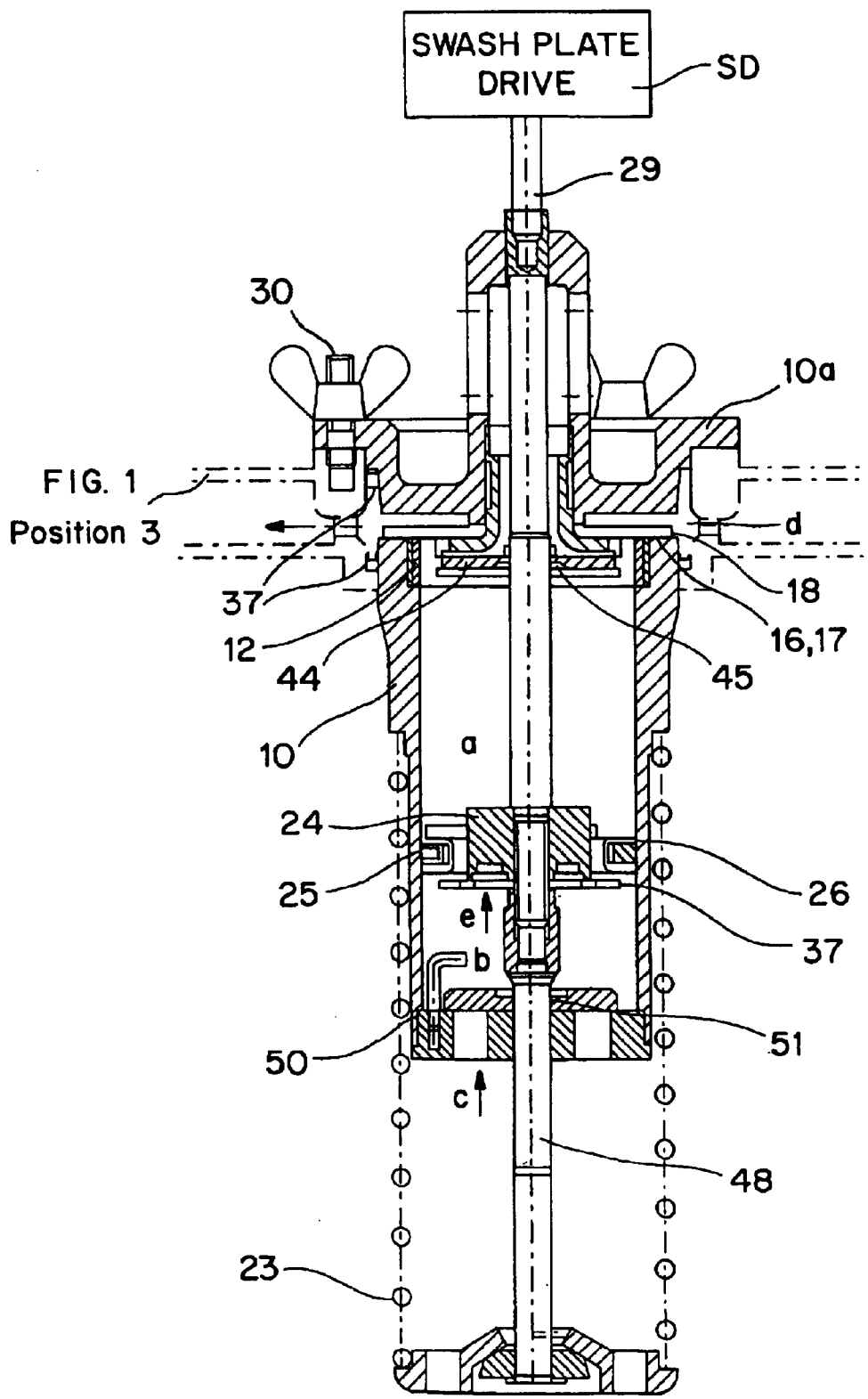
FIG. 2 shows a full section of one of the three pumps inserted into the pressure housing.

Pressure housing 3 is used in container 1 not only to receive pumps 2, but rather it also divides container 1 into two chambers h and f. While chamber h is connected directly via liquid feed line i to the liquid in storage tank K, the liquid is introduced into chamber f via gas return line j. For this purpose, gas return line j ends in chambers h, f as well as in the gas chamber of storage tank K, so that with liquid that communicates with the tank entering at o, p flows into chamber f via pipe opening p. The gas that accumulates when the pump is cooled is fed to gas chamber G of storage tank K. If liquid level m rises over pipe opening p, a liquid seal is carried out, and the gas that is located in chamber f cannot escape. Since the pressure in storage container $P_1$ is greater by the amount of $P_0$+density of the liquid x height than tank pressure $P_0$, the liquid that is located in container 1 in the boiling state is warmer by this amount than in storage tank K. During pump operation, as depicted in FIG. 2, the liquid to be delivered enters via holes c into the pumps. Since these entrance holes are assigned to chamber h (FIG. 1), the liquid to be delivered is removed from the latter. In this case, liquid level n that is in gas return line 7 drops by the amount of the resistance in liquid feed line i. The resulting lowering of pressure in container 1 produces a lowering of liquid level m, so that higher gas pressure $P_1$ is degraded via pipe opening p until a new equilibrium state is established, and the liquid again blocks the gas discharge. Since the feeder liquid that flows from full storage tank K (high liquid column) is not now in a state of pressure and temperature equilibrium, but rather has the lower temperature of storage tank K at $P_0$ (boiling state), a cooling of the temperature level in chamber h is carried out (in the case of a full tank, the pump delivers only the incoming colder liquid). Based on the spatial division of container 1 by pressure housing 3 into two chambers h and f, an always constant, self-regulating liquid level m in container 1 (also during operation of the pump) and a thermal separation of liquids are carried out. By this thermal separation of two chambers h and f, also during pump operation, the liquid also remains in upper chamber f always in the boiling state of $P_1$, and the heat that enters via neck pipe 6 as well as the conduction of the low level of pump heat via valve 4 depicted in FIG. 2 is fed in gas form via liquid seal p to storage tank K. A non-division of the container has the result that during pump operation and with a full storage tank K, the input of heat that is only very low and toxic via container neck pipe 6 would not be sufficient to heat the incoming colder liquid corresponding to pressure $P_1$ in the boiling state. Based on these facts, a condensing-down of gas would take place, and the cold liquid would increase more and more in container 1 and cause an expulsion of the upper part of the container by overflowing.

In FIG. 2, a full section of one of the three pumps that are inserted into the pressure housing is depicted. The pump that is attached at the pressure housing (FIG. 1, reference number 3) by means of screws 30 has a pump cylinder 10, which is screwed to a blind flange 10a via a flow part 12. In this case, a ring gap d is formed, in which a membrane-pressure valve 16,17 that is loaded with a disk spring 18 is attached. By the presence of this ring gap d as well as its two-sided seal 37, the individual installation of the pumps in the common pressure housing is possible.

The three pumps are actuated by a swash plate drive SD that is attached at the container cover, not shown. The cryogenic liquid that is to be delivered is located in the container, which has a capacity of only a few liters. The transmission of the tensile forces for the pump pressure stroke from the drive to the pumps that are immersed in the container liquid is carried out via connecting rods 29 that are sealed in the container cover. When the stroke reverses plungers 14, 17 are brought into a starting position opposite the pressure stroke by the force of springs 23. Here, a plunger ring 15, 16 that is pressed against pump cylinder 1 by springs is brought to rest on the arms of plunger body 14. Via the gap that is to be adjusted in this way, the liquid from the previous stroke cycle is hurled without pressure onto pressure side a of the plunger. At the same time, at the beginning of this stroke, a valve 4, in which a seal 5 is attached to seal connecting rod 29, was forced open by connecting rod 29 by the friction. Here, the heat that was produced by the plunger friction was drained off, so that optimum filling of the cylinder is thus always guaranteed. The temperature of the pressure liquid relative to the stored liquid also is not altered by this process, which has a positive effect on the measurement of the amount released.

When the stroke reverses, valve [4] 44 is initially closed by connecting rod 29, before plunger ring 25, 26 closes the gap at plunger body 24, and the pressure liquid is pushed into the common pressure housing (FIG. 1, reference number 3) via membrane-exhaust valve 16,17 that is loaded by spring 18 from pump cylinder 10.

When the design pressure (maximum delivery pressure) is exceeded, a pressure limiter 37 that is designed as a disk spring is pressed through plunger ring 25, 26 from plunger body 24, and the overpressure is degraded via holes e. At the time when this stroke reverses, a bottom valve 50 that is located at the lower end of the pump cylinder, which is opened by a defined friction of a seal 51 on lower portion 48 of connecting rod 29, was also immediately opened. The stored liquid, without having to open a valve, can now flow back without pressure loss into volume b that is released from plungers 24,37 into the pump cylinder via holes c. Shortly before the top dead center and because of the reduction in diameter of connecting rod 48, the friction between the latter and bottom valve 50 is withdrawn, and bottom valve 50 closes under the action of its own weight.

With the described pump arrangement, it is possible to pump liquids also with low levels of evaporation heat, such as, e.g., liquid hydrogen in the boiling state (without a static column) with good delivery efficiency. Since the heating of the pump cylinder is impossible through the forced opening of valve 4, an optimum cylinder filling is carried out with each stroke, whereby the otherwise usual heating of the feeder liquid is prevented.

What is claimed is:

1. A pump system for delivering cryogenic liquids with a container for receiving cryogenic liquid and at least one reciprocating pump that is arranged in the container in such a way that only the pump (2) is completely immersed in the cryogenic liquid, wherein the reciprocating pump has at least one connecting rod (29) that is connected only to a plunger (24, 37), only said connecting rod (29) being brought out from the container (1) through a heat insulation (7) of a neck pipe (6) for coupling with a driving unit so that tensile forces can be applied from outside of the container, the connecting rod (29) being provided with a return spring (23) in such a way that said plunger (24, 37) can be returned to a starting position opposite the pressure stroke, whereby the connecting rod (29) is the only thermal bridge from the pump (2) to the driving unit.

2. A pump system according to claim 1, wherein
a pump cylinder (10) of the reciprocating pump is divided by the plunger (24, 37) into a pressure side (a) and an induction side (b), whereby the plunger (24, 37) has 4 plunger body (24) as well as a movable plunger ring (25, 26) that is brought to rest on plunger body (24) when plunger (24, 37) moves in the direction opposite the pressure stroke in such a way that a gap is formed that produces a connection between pressure side (a) and induction side (b) and closes the gap when plunger (24, 37) moves in the pressure stroke, on the pressure-side end of pump cylinder (10), a spring-loaded exhaust valve ( 16,17) is provided, and on the induction-side end of pump cylinder (10), a bottom valve (50) is arranged that can be actuated by means of the connecting rod (29) in such a way that it opens on the pressure stroke and is closed when the stroke reverses.

3. A pump system according to claim 1, wherein on the pressure-side end of pump cylinder (10), a seal (45) is arranged to seal connecting rod (29) relative to a pump housing, which has a valve (44) that can be actuated by the connecting rod (29), and said valve (44) is closed when tensile forces are exerted on connecting rod (29) and is opened when connecting rod (29) returns under the action of the spring.

4. A pump system according to one of claim 1, wherein the reciprocating pump is inserted into the container from above, so that the induction side of the reciprocating pump is immersed in the cryogenic liquid.

5. A pump system according to one of claim 1, wherein the container is vacuum-insulated.

6. A pump system according to claim 1, wherein several reciprocating pumps (2) are arranged in the container (1) and are connected on the pressure side (a) to a common pressure housing (3).

7. A pump system according to claim 6, wherein the connecting rods (29) of the individual reciprocating pumps are connected to a swash plate drive that is arranged outside of the container.

8. A pump system according to claim 6, wherein the neck pipe (6) with the insulation (7) therein has only the connecting rods (29) extending therethrough for coupling with the driving unit; whereby the connecting rods (29) are the only thermal bridges from the pump (2) to the driving unit.

* * * * *

UNITED STATES PATENT AND TRADEMARK OFFICE
CERTIFICATE OF CORRECTION

PATENT NO. : 6,722,866 B1
DATED : April 20, 2004
INVENTOR(S) : Dresler

It is certified that error appears in the above-identified patent and that said Letters Patent is hereby corrected as shown below:

Title page,
Item [54], Title, change "PUMP SYSTEM FOR DELIVERING CRYOGENIC LIQUIDS" to -- A RECIPROCATING PUMP WITH AN INSULATED PUMP CHAMBER FOR DELIVERING CRYOGENIC LIQUIDS --.

Column 5,
Line 4, change "4" to -- a --.
Line 13, change "(16,17)" to -- (16, 17) --.

Column 6,
Lines 4 and 8, delete "one of".

Signed and Sealed this

Eleventh Day of January, 2005

JON W. DUDAS
*Director of the United States Patent and Trademark Office*